US008102763B2

(12) United States Patent
Du et al.

(10) Patent No.: US 8,102,763 B2
(45) Date of Patent: Jan. 24, 2012

(54) METHOD, SYSTEM AND NODE FOR BACKPRESSURE IN MULTISTAGE SWITCHING NETWORK

(75) Inventors: Wenhua Du, Shenzhen (CN); Yun Lin, Shenzhen (CN); Lian Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 12/391,115

(22) Filed: Feb. 23, 2009

(65) Prior Publication Data

US 2009/0161685 A1 Jun. 25, 2009

Related U.S. Application Data

(63) Continuation of application No. PCT/CN2008/070232, filed on Feb. 1, 2008.

(30) Foreign Application Priority Data

Feb. 10, 2007 (CN) .......................... 2007 1 0073276

(51) Int. Cl.
H04L 12/28 (2006.01)
(52) U.S. Cl. ........................................ 370/230; 370/412
(58) Field of Classification Search .................. None
See application file for complete search history.

(56) References Cited

U.S. PATENT DOCUMENTS

| 4,153,916 | A | * | 5/1979 | Miwa et al. | 358/406 |
|---|---|---|---|---|---|
| 5,787,071 | A | * | 7/1998 | Basso et al. | 370/231 |
| 6,011,779 | A | * | 1/2000 | Wills | 370/236 |
| 6,671,255 | B1 | * | 12/2003 | Buhrgard et al. | 370/230 |
| 6,973,032 | B1 | * | 12/2005 | Casley et al. | 370/230 |

FOREIGN PATENT DOCUMENTS

| CN | 1180576 | C | 12/2004 |
|---|---|---|---|
| CN | 1288876 | C | 6/2006 |
| CN | 1848803 | A | 10/2006 |
| CN | 101035076 | A | 6/2009 |
| CN | 100591047 | C | 2/2010 |

OTHER PUBLICATIONS $1^{st}$ Office Action in corresponding Chinese Application No. 200710073276.2 (Mar. 6, 2009).
$2^{nd}$ Office Action in corresponding Chinese Application No. 200710073276.2 (Jun. 5, 2009).
Written Opinion of the International Search Report in corresponding PCT Application No. PCT/CN2008/070232 (May 15, 2008).
International Search Report in corresponding PCT Application No. PCT/CN2008/070232 (May 15, 2008).

* cited by examiner

*Primary Examiner* — Chirag Shah
*Assistant Examiner* — Salvador E Rivas
(74) *Attorney, Agent, or Firm* — Leydig, Voit & Mayer, Ltd.

(57) ABSTRACT

The present invention provides a backpressure method, system, and intermediate stage switching node of a multistage switching network and an intermediate stage switching node. The method includes: (i) the intermediate stage switching node receives a first backpressure information; and (ii) the intermediate stage switching node sends at least part of the first backpressure information to an upper stage switching node, wherein there is no response sent by the intermediate switching node to at least part of the first backpressure information.

15 Claims, 6 Drawing Sheets

S1 switching unit queue structure

S3 switching unit queue structure

N-stage (N>2) switching network backpressure system

ABOUT US 8,102,763 B2

METHOD, SYSTEM AND NODE FOR BACKPRESSURE IN MULTISTAGE SWITCHING NETWORK

CROSS-REFERENCE TO RELATED APPLICATIONS

This application is a continuation of International Application No. PCT/CN2008/070232, filed Feb. 1, 2008, which claims priority to Chinese Patent Application No. 200710073276.2, filed Feb. 10, 2007 and entitled "Backpressure Method, System and Node of Multistage Switching Network and Intermediate Stage Switching Node", both of which are hereby incorporated by reference in their entireties.

FIELD OF THE INVENTION

The present invention relates to communication technologies, and in particular, to a method and system for backpressure in a multistage switching network and an intermediate stage switching node.

BACKGROUND OF THE INVENTION

In a multistage switching network, some or all switching nodes need a buffer for temporary storage of packets to solve the inconsistency between the transmit rate and the receive rate. However, the capacity of a buffer is limited. Therefore, the backpressure mechanism is often used for input traffic control to avoid packet loss caused by buffer overflow.

Backpressure means that according to the buffer usage, a lower stage node sends backpressure information to an upper stage node, instructing the upper stage node not to send packets until it is instructed to do so. According to the causes of generation, backpressure information can be classified into global backpressure and queue backpressure. When the number of the packets in a buffer reaches or exceeds a certain threshold, global backpressure information is generated. For the purposes of solving problems, the packets in the buffer are queued according to certain rules, to form multiple queues, and in each of the queues, packets are sent in order. When the length of a queue reaches or exceeds a certain threshold, queue backpressure information is generated.

The backpressure transfer and response mechanism in the related art is to send backpressure information among the switching nodes with a buffer stage by stage. In other words, a switching node with a buffer responds to all backpressure information sent by the lower stage switching node, but does not forward such backpressure information to the upper stage switching node.

During the invention, the inventor finds that the related art has at least the following weaknesses:

In the backpressure transfer and response mechanism, a complex internal structure and corresponding processing modules are needed to enable the intermediate stage node in a multistage switching network to respond to all received backpressure information, which raises the design complexity and increases the realization costs.

SUMMARY OF THE INVENTION

Various embodiments of the present invention provide a backpressure method, system and node of a multistage switching network and an intermediate stage switching node to simplify the internal structure of the intermediate stage switching node, reduce the design complexity and design costs.

An embodiment of the present invention discloses a backpressure method in a multistage switching network. The backpressure method includes: an intermediate stage switching node receives backpressure information, does not respond to at least some of the received backpressure information, and sends the non-responded backpressure information to an upper stage switching node; and a stage 1 switching node responds to the received backpressure information.

An embodiment of the present invention discloses a backpressure system in a multistage switching network. The backpressure system includes: at least one intermediate stage switching node and a stage 1 switching node. The intermediate stage switching node is adapted to receive backpressure information, make no response to at least some of the received backpressure information, and send the non-responded backpressure information to the stage 1 switching node. The stage 1 switching node is adapted to respond to the received backpressure information.

An embodiment of the present invention discloses an intermediate stage switching node in a multistage switching network. The intermediate stage switching node includes: an input module, a buffer module, a backpressure information response module, and an output module. The input module is adapted to receive packets, parse out data information and backpressure information from the packets, classify the backpressure information into responded and non-responded backpressure information, and send the responded backpressure information to the backpressure information response module. The buffer module is adapted to store the data information parsed out from the packets. The backpressure information response module is adapted to instruct the output module to stop sending corresponding packets to a lower stage switching node according to the responded backpressure information. The output module is adapted to obtain the data information parsed out from the packets from the buffer module, recombine the packets according to the non-responded backpressure information, send the recombined packets, and stop sending corresponding packets to the lower stage switching node as instructed by the backpressure information response module.

An embodiment of the present invention discloses an intermediate stage switching node in a multistage switching network. The intermediate stage switching node includes: an input module, a buffer module, and an output module. The input module is adapted to receive packets and parse out data information and backpressure information from the packets. The buffer module is adapted to store the data information parsed out from the packets. The output module is adapted to obtain the data information parsed out from the packets from the buffer module, recombine the packets according to the backpressure information, and send the recombined packets.

An embodiment of the present invention discloses a backpressure method of the intermediate stage switching node in a multistage switching network. The backpressure method includes: receiving backpressure information; making no response to at least some of the received backpressure information; and sending the at least some of backpressure information to an upper stage switching node.

An embodiment of the present invention discloses an intermediate stage switching node in a multistage switching network. The intermediate stage switching node includes: a unit adapted to receive backpressure information, and a unit adapted to make no response to at least some of the received backpressure information and send the at least some of backpressure information to an upper stage switching node.

DETAILED DESCRIPTION OF THE INVENTION

According to embodiments of the present invention, in a multistage switching network, an intermediate stage switching node with a buffer does not respond to the backpressure information from the lower stage switching node or only responds to some of backpressure information, and sends the non-responded backpressure information to the upper stage switching node.

The embodiments of the present invention are hereinafter described in detail by reference to the accompanying drawings. The backpressure transfer and response mechanism in a multistage switching network are described as follows taking a three-stage switching network as an example.

Figure 1:
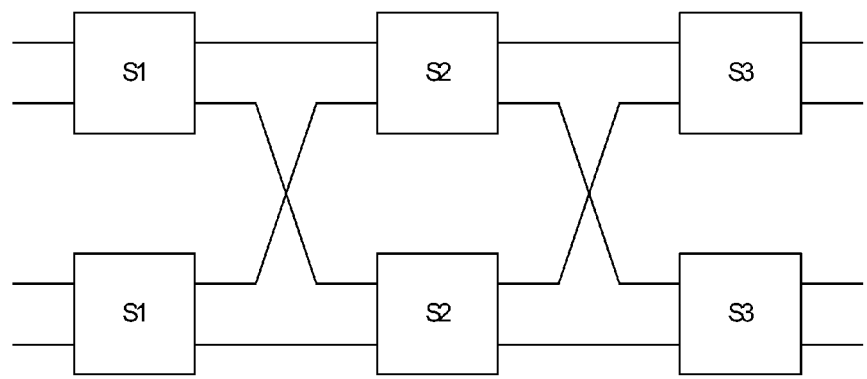
FIG. 1 shows the structure of a 4×4 three-stage switching network.

FIG. 1 shows a 4×4 three-stage switching network that uses the backpressure transfer and response mechanism, and the switching network has four input ports and four output ports. Suppose that there are only global backpressure information and queue backpressure information in this network. S1 indicates a stage 1 switching unit, S2 indicates a stage 2 switching unit, and S3 indicates a stage 3 switching unit in the three-stage switching network. Each stage switching unit has two switching units, each having a buffer.

Figure 2:
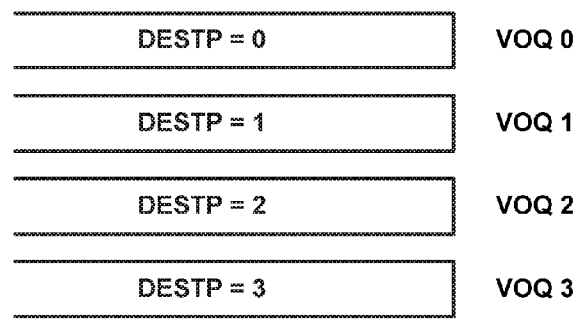
FIG. 2 shows the structure of a queue in the S1 switching unit shown in FIG. 1.
Figure 3:
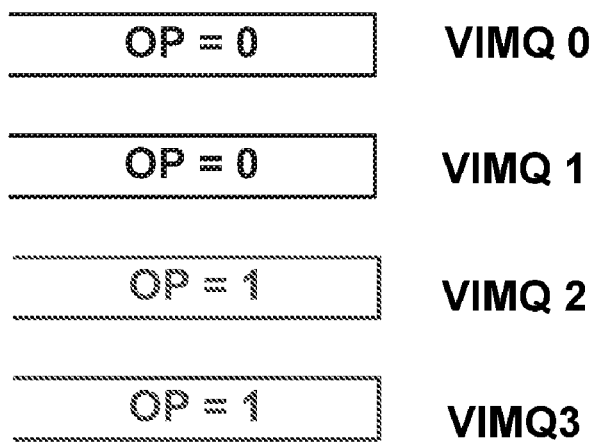
FIG. 3 shows the structure of a queue in the S3 switching unit shown in FIG. 1.

To improve the performance of the switching network, S1, S2, and S3 switching units use a queue structure to queue packets. The packets in the S1 switching unit are often queued in a virtual output queue (VOQ) mode. FIG. 2 shows the queue structure of an S1 switching unit. As shown in FIG. 1, the three-stage switching network has four output ports. Therefore, the S1 switching unit adopts the VOQ mode to organize the packets into four big queues, VOQ0-VOQ3, corresponding to the four output ports of the network. These four VOQs can be further classified by priority. The packets in the S3 switching unit are often organized in a virtual input module queue (VIMQ) mode. FIG. 3 shows the queue structure of an S3 switching unit. Each S3 switching unit has two output ports. The packets come from different S1 switching units and correspond to the queues of the output ports of different S3 switching units. Therefore, the output ports of each S3 switching unit are categorized into two queues. In this way, four queues, namely, VIMQ0 to VIMQ3, are formed in the S3 switching unit. Similarly, the four VIMQs can be further classified according to some information such as priority.

When the length of a VIMQ in the S3 switching unit reaches or exceeds a certain threshold, queue backpressure information is generated. When the number of the packets in an S3 switching unit reaches or exceeds a certain threshold, global backpressure information is generated. The S3 switching unit sends the backpressure information to all S2 switching units.

Figure 4:
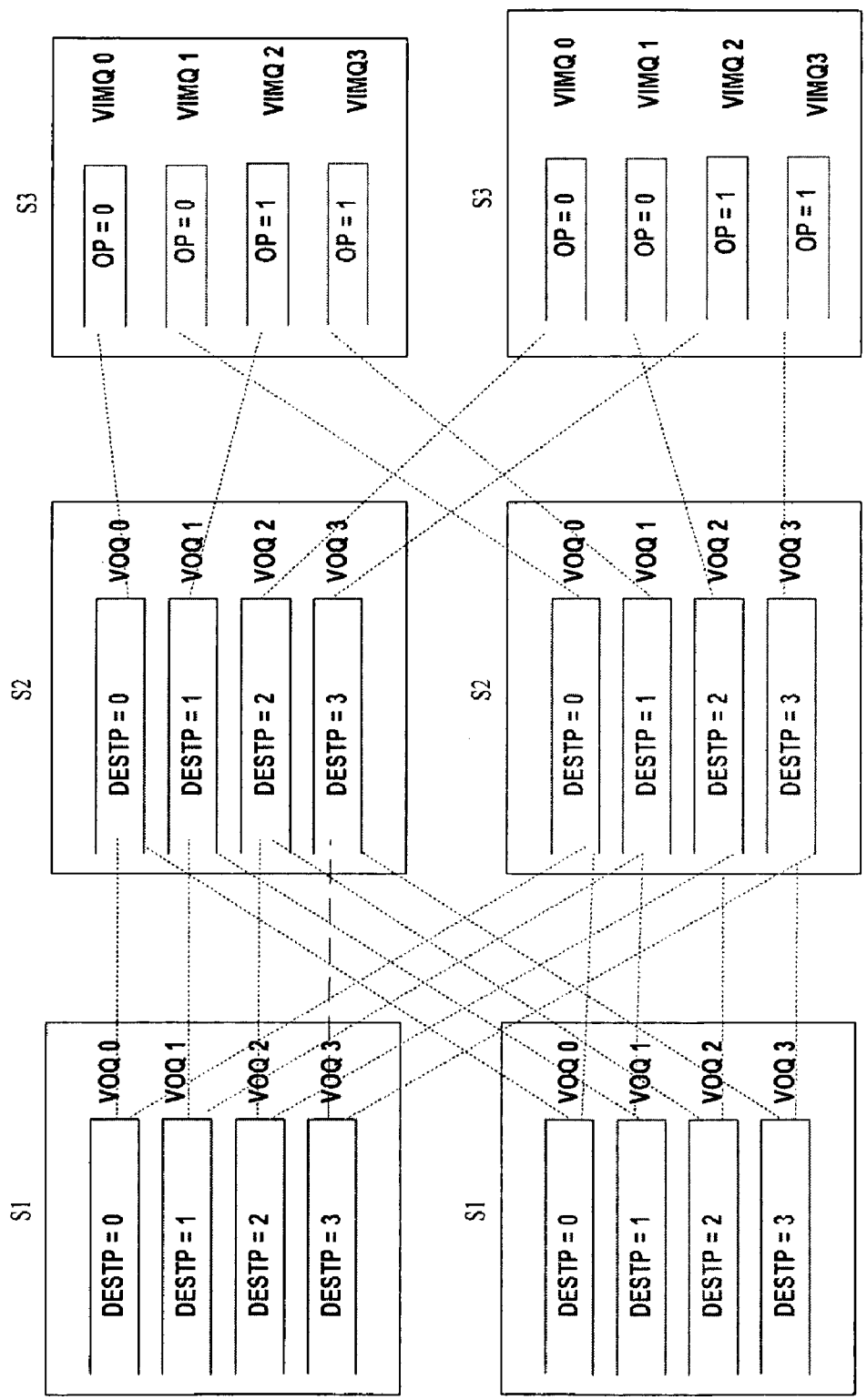
FIG. 4 shows the mapping between the VOQ of the S2 switching unit and the VIMQ of the S3 switching unit shown in FIG. 1.

The S2 switching unit also adopts the queue structure. Like the S1 switching unit, the S2 switching unit organizes the packets in the VOQ mode into four big queues VOQ0-VOQ3, corresponding to the four output ports of the switching network. These four VOQs can be further classified according to the queue structure of the S3 switching unit. Each VOQ in the S2 switching unit corresponds to one VIMQ in the S3 switching unit. Each VOQ in the S1 switching unit corresponds to one VOQ in the S2 switching unit. FIG. 4 shows the mapping between the queues of different stage switching units.

The S2 switching unit responds to the backpressure information sent by the S3 switching unit, but does not forward such information to the S1 switching unit. When receiving the global backpressure information from an S3 switching unit, the S2 switching unit decides whether to continue sending the packets (namely, the packets in all VOQs in the S2 switching unit) to the S3 switching unit. For example, after receiving a request for global backpressure information from an S3 switching unit, the S2 switching unit stops sending the packets (namely, the packets in all VOQs corresponding to the S3 switching unit) to the S3 switching unit. After receiving the queue backpressure information from an S3 switching unit, the S2 switching unit decides whether to continue sending the packets in VOQs of the S2 switching unit. According to the mapping shown in FIG. 4, when a VIMQ in the S3 switching unit generates backpressure, the packets in the corresponding VOQs in the S2 switching unit are not sent until the queue backpressure information of the VIMQ is cancelled.

Similarly, the backpressure information generated by an S2 switching unit is sent to all S1 switching units. If an S2 switching unit sends global backpressure information to an S1 switching unit, the S1 switching unit no longer sends the packets (namely, the packets in all queues corresponding to the S2 switching unit) to this S2 switching unit. If a VOQ in the S2 switching unit generates backpressure information, the packets in the corresponding VOQs in the S1 switching unit stop being sent.

In the foregoing technical solution, because the queue backpressure information needs to be sent through the three-stage switching network, the S2 switching unit must adopt a more complex queue structure, and the queue backpressure generation and response modules must be added. Consequently, the S2 switching unit is harder to be implemented.

The following describes another embodiment of the present invention. For descriptive purposes, a 4×4 three-stage switching network is used as an example, supposing only global backpressure information and queue backpressure information are generated in the network. The technical solution provided in the present invention may be applied to, but not limited to, 4×4 three-stage switching networks, and the backpressure information includes, but not limited to, global backpressure information and queue backpressure information (for example, priority backpressure information).

As shown in FIG. 1, a 4×4 three-stage switching network has four input ports, four output ports, and three-stage switching nodes. S1 indicates a stage 1 switching node, S2 indicates a stage 2 switching node, and S3 indicates a stage 3 switching node in the three-stage switching network.

Figure 5:
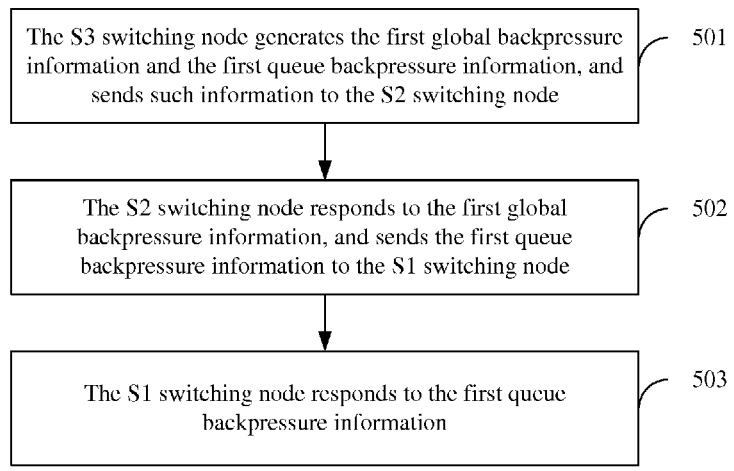
FIG. 5 is a flowchart of a backpressure method according to an embodiment of the present invention.

An embodiment of the present invention provides a backpressure method of the multistage switching network. As shown in FIG. 5, the method includes:

Block 501: The S3 switching node generates the first global backpressure information and the first queue backpressure information and sends such information to the S2 switching node.

Block 502: The S2 switching node responds to the first global backpressure information and sends the first queue backpressure information to the S1 switching node.

Block 503: The S1 switching node responds to the first queue backpressure information.

The S2 switching node may respond to the first queue backpressure information and send the first global backpressure information to the S1 switching node; or, the S2 switching node may respond to neither the first global backpressure information nor the first queue backpressure information, but send such information to the S1 switching node. Accordingly, the S1 switching node responds to the received first global backpressure information, or the received first global backpressure information and the first queue backpressure information.

The method may further include the following process:

the S2 switching node generates the second global backpressure information and sends it to the S1 switching node; or, the S2 switching node generates the second queue backpressure information, or the second global backpressure information and the second queue backpressure information; and the S1 switching node responds to the second global backpressure information and/or the second queue backpressure information from the S2 switching node.

In another multistage switching network, there may be multiple intermediate switching nodes, each of which does not respond to the backpressure information sent from the lower stage switching node or only responds to some of the backpressure information, and sends the non-responded backpressure information to an upper stage switching node. The stage 1 switching node responds to all received backpressure information.

According to an embodiment of the present invention, the intermediate stage switching node does not respond to the backpressure information sent by the lower stage switching node or only responds to some of the backpressure information, and sends the non-responded backpressure information to the upper stage switching node. The specific process includes:

receiving packets, parsing out data information and backpressure information from the packets, and classifying the backpressure information into responded and non-responded backpressure information;

stopping sending the corresponding packets to the lower stage switching node according to the responded backpressure information; and recombining the packets and sending the recombined packets according to the non-responded backpressure information, specifically, loading the non-responded backpressure information to the data information to be sent, recombining the packets, and sending the recombined packets.

According to another embodiment of the present invention, the intermediate stage switching node does not respond the backpressure information sent by the lower stage switching node or only responds to some of the backpressure information, and sends the non-responded backpressure information to an upper stage switching node. The specific process includes:

receiving packets and parsing out data information and pressure information from the packets; and recombining the packets and sending the recombined packets according to the backpressure information, specifically, loading the backpressure information to the data information to be sent, recombining the packets, and sending the recombined packets.

When the intermediate stage switching node generates backpressure information, it can also send such information to an upper stage switching node. In this case, the backpressure information generated by the intermediate stage switching node is also loaded to the data information to be sent during the packet recombining. The backpressure information generated by the intermediate stage switching node, and the non-responded backpressure information sent by the lower stage switching node can be loaded to the data information respectively or after such information is merged according to preset rules.

A backpressure system provided in an embodiment of the present invention includes: S1, S2, and S3 switching nodes.

The S3 switching node is adapted to generate the first global backpressure information and the first queue backpressure information and send such information to the S2 switching node.

The S2 switching node is adapted to receive the first global backpressure information and the first queue backpressure information, respond to the first global backpressure information, send the first queue backpressure information to the S1 switching node, and generate the second global backpressure information and/or the second queue backpressure information; or, the S2 switching node may respond to the first queue backpressure information and send the first global backpressure information to the S1 switching node; or, the S2 does not respond to the first global backpressure information or the first queue backpressure information, but sends such information to the S1 switching node.

The S1 switching node is adapted to respond to the received backpressure information.

If the S2 switching node does not respond to queue backpressure information but responds to global backpressure information, complex queue structures or queue backpressure information response modules are not needed. This simplifies the structure of the S2 switching node.

Figure 6:
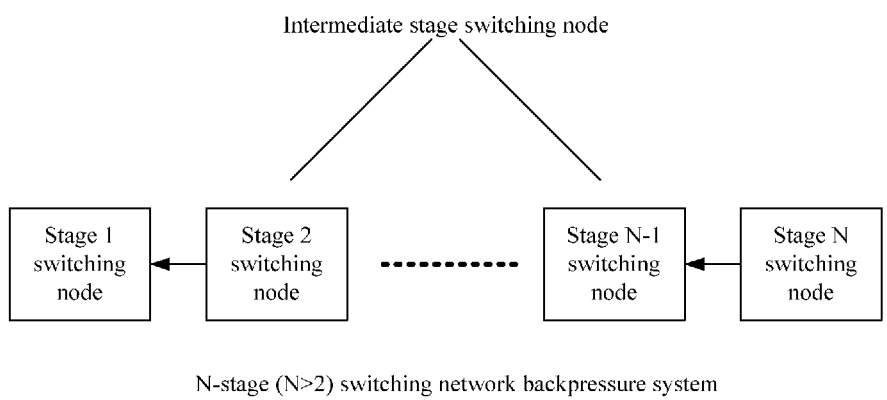
FIG. 6 shows the structure of a system according to an embodiment of the present invention.

In another multistage switching network, there may be multiple intermediate stage switching nodes. An N-stage (N>2) switching network includes a stage 1 switching node, a stage 2 switching node, . . . , a stage N−1 switching node, and a stage N switching node. Among them, the stage 2 switching node, . . . , and the stage N−1 switching node are intermediate stage switching nodes. As shown in FIG. 6, a backpressure system provided in an embodiment of the present invention includes: a stage N switching node, one or multiple intermediate stage switching nodes, and a stage 1 switching node.

The stage N switching node is adapted to generate backpressure information and send the backpressure information to an upper stage switching node.

The intermediate stage switching node is adapted to receive the backpressure information from the lower stage switching node, make no response to at least one kind of the backpressure information, and send the non-responded backpressure information to an upper stage switching node.

The stage 1 switching node is adapted to respond to the received backpressure information.

Figure 7:
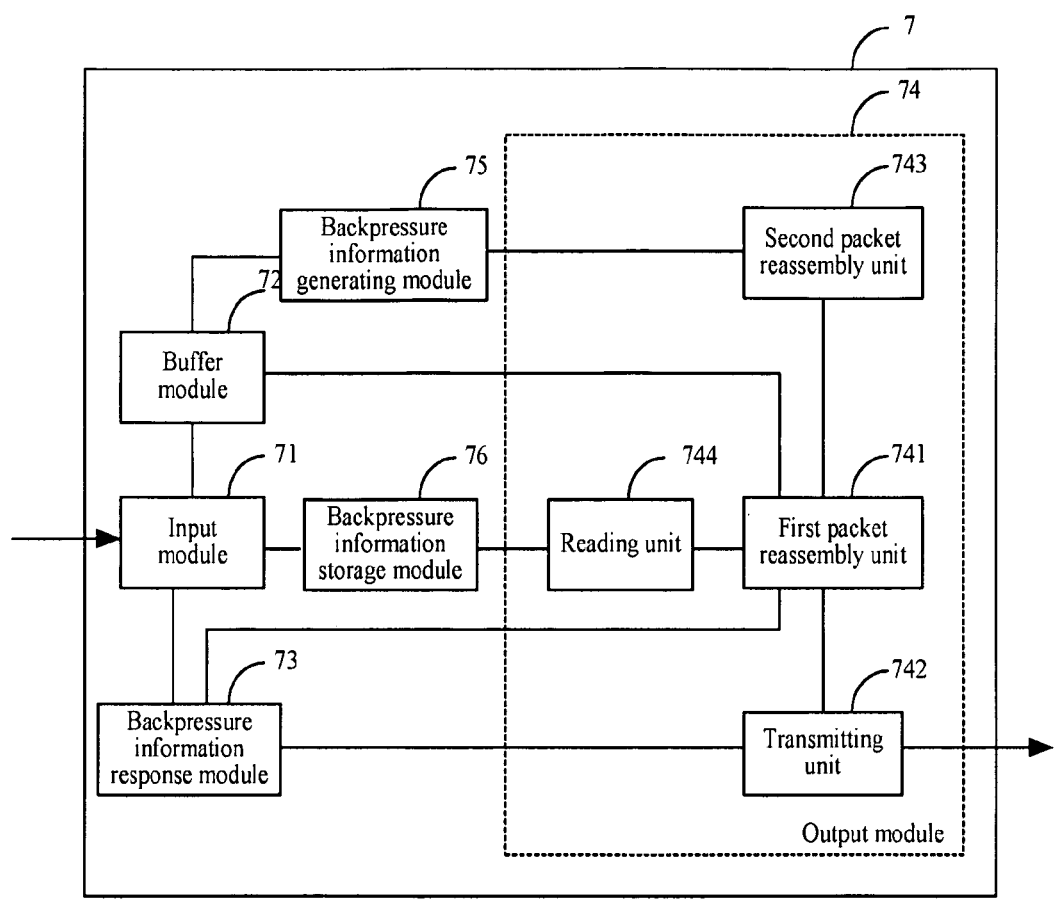
FIG. 7 shows the structure of the intermediate stage switching unit shown in FIG. 6 according to embodiment one of the present invention.

As shown in FIG. 7, an intermediate stage switching node 7 provided in an embodiment of the present invention includes: an input module 71, a buffer module 72, a backpressure information response module 73, and an output module 74.

The input module 71 is adapted to receive packets, parse out data information and backpressure information from the packets, classify the backpressure information into responded and non-responded backpressure information, and send the responded backpressure information to the backpressure information response module 73.

The buffer module 72 is adapted to store the data information parsed out from the packets.

The backpressure information response module 73 is adapted to instruct the output module 74 to stop sending corresponding packets to the lower stage switching node according to the responded backpressure information.

The output module 74 is adapted to obtain the data information parsed out from the packets from the buffer module 72, recombine the packets according to the non-responded backpressure information, send the recombined packets, and stop sending corresponding packets to the lower stage switching node as instructed by the backpressure information response module 73.

The output module 74 further includes a first packet recombining unit 741 and a transmitting unit 742.

The first packet recombining unit 741 is adapted to receive the non-responded backpressure information, obtain the data information from the buffer module 72, load the non-responded information to the data information to be sent, recombine packets, and stop obtaining data information from the buffer module 72 for packet recombining as instructed by the backpressure information response module 73.

The transmitting unit 742 is adapted to transmit recombined packets, receive notifications from the backpressure information response module 73, and stop transmitting packets to the lower stage switching node according to notifications.

The intermediate stage switching node may further include: a backpressure information generating module 75, adapted to generate backpressure information according to the usage of the buffer module.

In this case, the output module 74 includes a second packet recombining unit 743, adapted to load the backpressure information generated by the backpressure information generating module 75 to the data information to be sent. The backpressure information generated by the generating module 75 and the non-responded backpressure information parsed out from the backpressure information by the input module 71 can be loaded to the data information respectively or after they are merged according to preset rules.

The intermediate stage switching node may further include: a backpressure information storage module 76, adapted to store the non-responded backpressure information parsed out from the backpressure information by the input module.

In this case, the output module 74 further includes a reading unit 744, adapted to read the non-responded backpressure information from the backpressure information storage module 76, and send the non-responded backpressure information to the first packet recombining unit 741. The backpressure information storage module is optional. The backpressure information storage module 75 and the buffer module 72 may be the same storage device, or two independent storage units in one storage device, or two independent storage devices.

Figure 8:
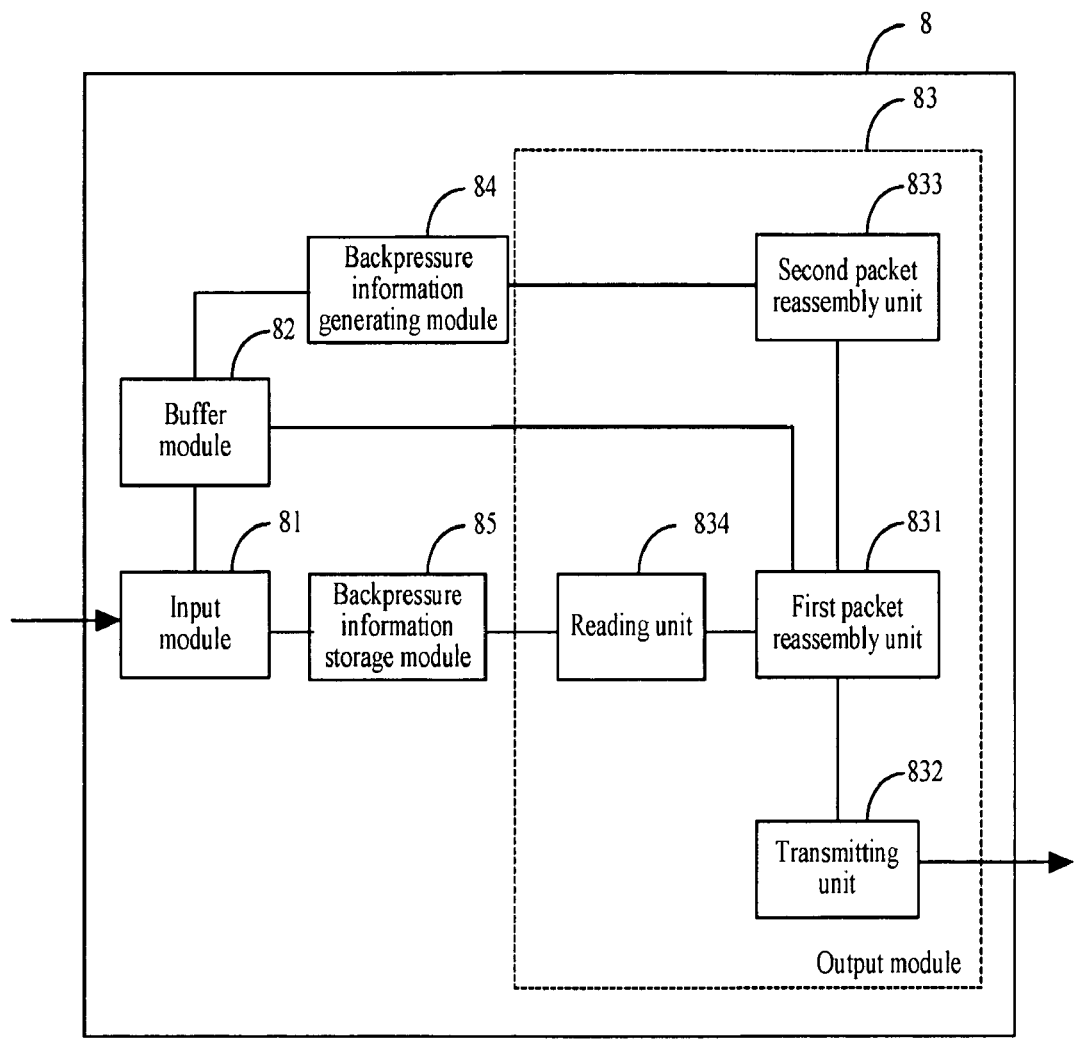
FIG. 8 shows the structure of the intermediate stage switching unit shown in FIG. 6 according to embodiment two of the present invention.

As shown in FIG. 8, an intermediate stage switching node 8 provided in an embodiment of the present invention includes: an input module 81, a buffer module 82, and an output module 83.

The input module 81 is adapted to receive packets and parse out data information and backpressure information from the packets.

The buffer module 82 is adapted to store the data information parsed out from the packets.

The output module 83 is adapted to obtain the data information parsed out from the packets, recombine the packets according to the backpressure information, and send the recombined packets.

The output module 83 further includes a first packet recombining unit 831 and a transmitting unit 832.

The first packet recombining unit 831 is adapted to receive the backpressure information, obtain the data information parsed out from the packets from the buffer module 82, load the backpressure information to the data information to be sent, and recombine the packets.

The transmitting unit 832 is adapted to transmit the recombined packets.

The intermediate stage switching node may further include: a backpressure information generating module 84, adapted to generate backpressure information according to the usage of the buffer module.

In this case, the output module 83 includes a second packet recombining unit 833 which is adapted to load the backpressure information generated by the backpressure information generating module 84 to the data information to be sent. The backpressure information generated by the generating module 84 and the backpressure information parsed out by the input module 81 can be loaded to the data information respectively or after they are merged according to preset rules.

The intermediate stage switching node may further include: a backpressure information storage module 85, adapted to store the non-responded backpressure information parsed out by the input module.

In this case, the output module 83 further includes a reading unit 834 which is adapted to read the non-responded backpressure information from the backpressure information storage module 85, and send such information to the first packet recombining unit 831. The backpressure information storage module is optional. The backpressure information storage module 85 and the buffer module 82 may be the same storage device, or two independent storage units in a storage device, or two independent storage devices.

According to embodiments of the present invention, in a multistage switching network, the intermediate stage switching node forwards the non-responded backpressure information from the lower stage switching node to the upper stage switching node. This can simplify the structure of the intermediate stage switching node and reduce costs.

In actual applications, the method for transferring backpressure information between the switching nodes may be implemented in multiple ways. Taking the multistage switching network shown in FIG. 1 as an example, S3 can send the backpressure information generated by S3 to S1, which is in the same chip as S3, through the internal channel between S3 and S1 (in the related art, S3 and S1 are often set in the same switching chip), and then S1 loads the backpressure information received from S3 to a packet to be sent to S2 (which may be one S2 or multiple S2 switching units in the same stage). As a result, the backpressure information generated by S3 is finally sent to S2 through the packet. This is considered to be an indirect sending mode. It is possible that S3 sends the backpressure information generated by it to S2 directly.

Similarly, S2 can send the received non-responded backpressure information, namely, the backpressure information generated by S3, to the upper stage switching node S1 (which may be one S1 or multiple S1 switching units in the same stage) in an indirect mode. That is, S2 loads the non-responded backpressure information to a packet to be sent to S3 (which may be one S3 or multiple S3 switching units in the same stage), and then S3 sends the backpressure information finally to S1 (in the same switching chip as S3) through the internal channel between S3 and S1; or, S2 directly sends the non-responded backpressure information to S1.

The embodiments described above are only exemplary ones of the invention, and are not meant to limit the scope of protection of the invention. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A backpressure method of the multistage switching network, comprising:
    receiving backpressure information sent from a lower stage switching node, by an intermediate switching node;
    sending, by the intermediate switching node, at least part of the backpressure information to an upper stage switching node; and
    the intermediate switching node continuing to send data packets corresponding to the at least part of the backpressure information to the lower stage switching node;
    wherein the backpressure information is for instructing the upper stage switching node not to send packets until the upper stage switching node is instructed to send packets;
    the method further comprising:
    classifying the backpressure information into non-responded backpressure information and responded backpressure information, wherein the non-responded backpressure information is the at least part of the backpressure information;
    stopping sending data packets corresponding to the responded backpressure information to the lower stage switching node; and
    sending the non-responded backpressure information to the upper stage switching node.

2. The method according to claim 1, wherein before sending at least part of the backpressure information to the upper stage switching node, the method further comprises: loading the at least part of the backpressure information to data information to be sent.

3. The method according to claim 1, wherein the backpressure information is first backpressure information, and the method further comprises:
    generating second backpressure information by the intermediate switching node, and sending the second backpressure information to the upper stage switching node.

4. The method according to claim 1, further comprising:
    storing the non-responded backpressure information by the intermediate switching node.

5. A backpressure system in a multistage switching network, comprising:
    at least one intermediate stage switching node, configured to receive backpressure information from a lower stage switching node; send at least part of the backpressure information to an upper stage switching node, and keep sending data packets corresponding to the at least part of the backpressure information to the lower stage switching node; and
    the upper stage switching node, configured to respond to the at least part of the backpressure information, wherein the backpressure information is for instructing the upper stage switching node not to send packets until the upper stage switching node is instructed to send packets;
    wherein the at least one intermediate stage switching node is further configured to classify the backpressure information into non-responded backpressure information and responded backpressure information, wherein the non-responded backpressure information is the at least part of the backpressure information; stop sending data packets corresponding to the responded backpressure information to the lower stage switching node; and send the non-responded backpressure information to the upper stage switching node.

6. The system according to claim 5, wherein the backpressure information is first backpressure information and the at least one intermediate stage switching node is further configured to generate second backpressure information and send the second backpressure information to the upper stage switching node.

7. An intermediate stage switching node in a multistage switching network comprises:
    an input module, configured to receive packets from a lower stage switching node, parse out data information and backpressure information from the packets, and classify the backpressure information into responded and non-responded backpressure information;
    a buffer module, configured to store the data information parsed out from the packets; and
    an output module, configured to obtain the data information from the buffer module, and recombine the packets according to the non-responded backpressure information and the data information, and send the recombined packets to an upper stage switching node, and keep sending data packets corresponding to the non-responded backpressure information to the lower stage switching node;
    wherein the backpressure information is for instructing the upper stage switching node not to send packets until the upper stage switching node is instructed to send packets.

8. The intermediate stage switching node according to claim 7, wherein
    the intermediate stage switching node further comprises:
    a backpressure information response module, configured to receive the responded backpressure information from the input module, and instruct the output module to stop sending packets to the lower stage switching node according to the responded backpressure information.

9. The intermediate stage switching node according to claim 7, wherein the output module comprises:
    a packet recombining unit, configured to receive the non-responded backpressure information parsed out by the input module, obtain the data information from the buffer module, load the non-responded information to the data information to be sent, recombine the packets, and stop obtaining data information from the buffer module for packet recombining as instructed by the backpressure information response module; and
    a transmitting unit, configured to transmit the recombined packets, receive notifications from the backpressure information response module, and stop transmitting packets to the lower stage switching node according to notifications.

10. The intermediate stage switching node according to claim 7, further comprising:
    a backpressure information storage module, configured to store the non-responded backpressure information parsed out by the input module;
    wherein the output module further comprises:
    a reading unit, configured to read the non-responded backpressure information from the backpressure information storage module, and send the non-responded backpressure information to the packet recombining unit.

11. The intermediate stage switching node according to claim 7, wherein the backpressure information is first backpressure information and the intermediate stage switching node further comprises:

a backpressure information generating module, configured to generate second backpressure information according to the usage of the buffer module;

wherein the output module further comprises:

a packet recombining unit, configured to load the second backpressure information to the data information to be sent by the transmitting unit.

12. The intermediate stage switching node according to claim 11, wherein the backpressure information is first backpressure information and the packet recombining unit is configured to load the non-responded backpressure information and the second backpressure information generated to the data information or after they are merged according to preset rules.

13. The method according to claim 1, wherein receiving backpressure information by an intermediate switching node comprising:

receiving packets; and parsing out data information and the backpressure information from the packets.

14. The method according to claim 1, wherein the backpressure information comprises: global backpressure information and queue backpressure information.

15. The method according to claim 1, wherein the non-responded backpressure information is queue backpressure information and the responded backpressure information is global backpressure information.

* * * * *